United States Patent [19]

Gorman

[11] Patent Number: 4,817,360
[45] Date of Patent: Apr. 4, 1989

[54] PREMOLDED FIBERGLASS DECK COVERING, DECK AND PREMOLDED FIBERGLASS COVERING COMBINATION, AND METHOD OF MAKING A PREMOLDED FIBERGLASS DECK COVERING

[76] Inventor: James R. Gorman, 2012 43rd Ave. East, Seattle, Wash. 98112

[21] Appl. No.: 47,024

[22] Filed: May 4, 1987

[51] Int. Cl.⁴ .............................................. E02D 37/00
[52] U.S. Cl. ........................................ 52/747; 52/514; 52/309.13; 264/36; 264/219
[58] Field of Search .................. 52/746, 747, 748, 514, 52/309.13; 264/255, 36, 219

[56] References Cited

U.S. PATENT DOCUMENTS

| | | |
|---|---|---|
| 2,688,580 | 9/1954 | Fingerhut . |
| 3,442,730 | 5/1969 | Dietz ........................................ 52/746 |
| 3,464,067 | 6/1969 | Hauck . |
| 3,464,178 | 9/1969 | Deichert ................................ 52/746 |
| 3,589,686 | 6/1971 | Russell . |
| 4,018,957 | 4/1977 | Werner ................................ 428/246 |
| 4,126,719 | 11/1978 | Koyanagi et al. . |
| 4,139,591 | 2/1979 | Jurisich . |
| 4,242,406 | 12/1980 | Bouhnini ............................. 428/246 |
| 4,313,866 | 2/1982 | Renshaw ............................. 524/287 |
| 4,438,174 | 3/1984 | Whewell ............................. 428/247 |
| 4,680,223 | 7/1987 | Bither ................................ 428/281 |
| 4,707,954 | 11/1978 | Batzen ...................................... 52/96 |

Primary Examiner—Henry E. Raduazo
Attorney, Agent, or Firm—Seed and Berry

[57] ABSTRACT

A method of covering a wood deck by premolding a fiberglass covering at a remote site and then bonding the premolded fiberglass covering to the wood deck using a flexible exterior mastic bonding agent. A premolded fiberglass covering including a laminated, seamless, premolded fiberglass covering having a decorative upper surface. A combination fiberglass-covered deck and seamless premolded fiberglass covering of gel coat, fiberglass, and cured resin with a flexible bonding material joining the covering to the wood deck.

4 Claims, 1 Drawing Sheet

PREMOLDED FIBERGLASS DECK COVERING, DECK AND PREMOLDED FIBERGLASS COVERING COMBINATION, AND METHOD OF MAKING A PREMOLDED FIBERGLASS DECK COVERING

TECHNICAL FIELD

This invention pertains to coverings for wood decks, and more particularly, to methods and products for forming and applying a premolded fiberglass deck covering to a wood deck.

BACKGROUND ART

Wood decks have the disadvantage of deteriorating rapidly under inclement weather conditions. In the northwest United States, for example, the wood decks are exposed to considerable mositure during the winter months and considerable heat during the drier summer months. This combination of heavy moisture accumulations and heavy drying periods causes the decks to crack and otherwise deteriorate.

As a result of the rapid deterioration of wood decks, it is a common practice to cover decks with a fiberglass covering. The conventional technique employed is to coat the wood deck with a layer of resin, apply strips of fiberglass material to the resin, and finally to seal the gaps between the strips of fiberglass by overlying the gaps with additional strips of fiberglass material. The resulting fiberglass deck covering has serious disadvantages. First of all, the strips of fiberglass applied over the gaps between the underlying strips of resin and figerglass produce an unsightly bulge or seam. Second, the direct attachment of the fiberglass material to the wood deck through the cured, rigid resin makes the fiberglass/resin combination an integral part of the wood deck structure. Subsequently, during changes in temperature, the wood deck will expand and contract at a different rate than the fiberglass and resin, causing the bond between the resin and the wood deck to eventually crack and cause the deck covering to delaminate from the wood deck.

DISCLOSURE OF THE INVENTION

It is an object of this invention to provide an improved method for covering a wood deck with a fiberglass covering.

It is another object of this invention to provide a deck and fiberglass covering combination which is more attractive and will wear considerably longer than conventional fiberglass covering on decks.

It is still another object to provide premolded fiberglass deck covering that is made at a factory and delivered as an integral unit to the wood deck site.

The method of this invention is best obtained by laying up the fiberglass covering at a remote site to a predetermined size in a mold, removing the covering from the mold, and then gluing the molded covering onto the wood deck at the deck location.

The premolded fiberglass covering for a wood deck includes a laminated, seamless, premolded figerglass covering having a decorative gel coat upper surface and a lower surface. Also included is a downwardly extending lip for overlying the end of the wood deck to prevent moisture from entering between the fiberglass covering and the wood deck. Preferably, the combination with the wood deck is obtained by attaching the seamless, premolded fiberglass covering of gel coat, fiberglass, and cured resin to the wood deck by a flexible bonding agent which allows the wood deck to expand and contract at a rate different from that at which the fiberglass covering expands and contracts. In this manner, the fiberglass covering will remain attached to the deck for a long period of time and will continue to protect the wood deck after many seasons of varying temperatures.

The advantages of the method and the product are obtained by being able to produce a deck with a fiberglass covering at a lower cost and with a better appearance and a longer life than fiberglass deck coverings which are laid up directly onto the wood deck at the deck location.

BRIEF DESCRIPTION OF THE DRAWINGS

FIG. 1 shows a mold that has been waxed and a release agent added. Preferably, an embossing pattern is applied to the mold prior to the waxing operation.

FIG. 2 shows a gel coat and coloring added to the mold.

FIG. 3 shows a resin added to the mold on top of the gel coat and coloring.

FIG. 4 shows fiberglass matting rolled into the resin in the mold. The mold in FIG. 4 is shown larger than the other molds in the other figures for purposes of illustration only.

BEST MODE FOR CARRYING OUT THE INVENTION

As best shown in FIGS. 1-4, the mold 10 is coated with a wax and release agent 12. If desired, the mold can be provided with an embossing pattern 14. After the wax has been buffed to a high shine and the release agent imparted onto the wax, a gel coat 15, with or without coloring, is applied to the wax and release agent.

Figure 1:
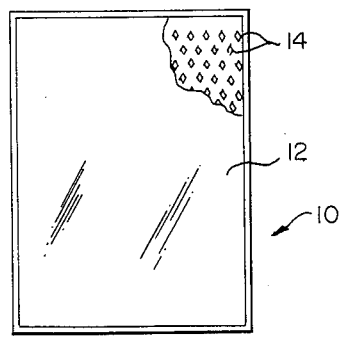
FIGS. 1-4 are schematic representations of the steps of the process for making the unique fiberglass deck covering.
Figure 2:
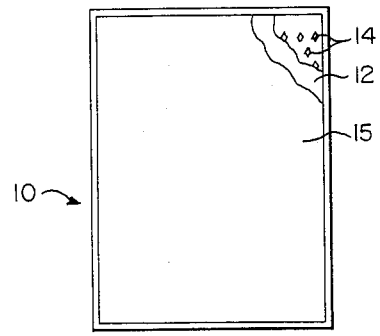
Figure 3:
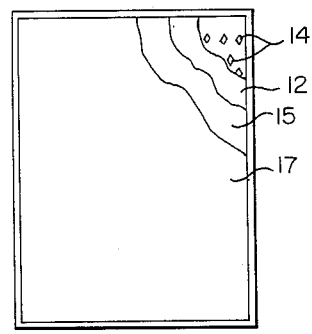

In FIG. 3, resin 17 is added to the gel coat.

Figure 4:
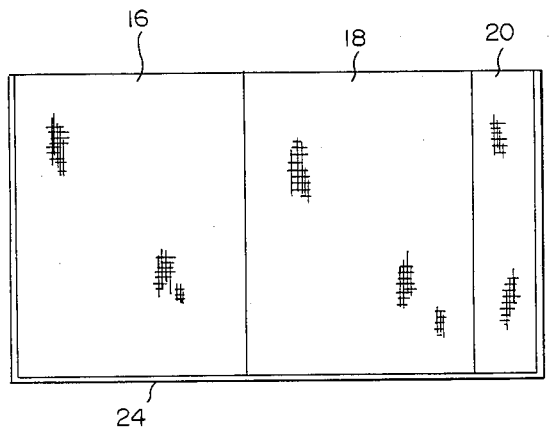

In FIG. 4, strips of fiberglass 16, 18 and 20, for example, are laid onto the moist resin and rolled into the resin, with additional resin being applied on the outer surfaces of the fiberglass until the fiberglass is completely saturated and embedded in the resin.

The gel coat/resin/fiberglass is then allowed to cure until it becomes sufficiently hard for removal from the mold. Preferably, a lip 24 is formed in the fiberglass while in the mold. The lip preferably will extend over all of the exposed edges of the wood deck that is going to be covered.

As will be apparent, the resin will provide securement between the adjacent strips of fiberglass so that no additional strips are necessary to close the seam between the strips of fiberglass. Furthermore, the upper surface of the fiberglass deck, which is removed from the mold, will be a highly finished, posssibly embossed, continuous, seamless deck covering.

Figure 5:
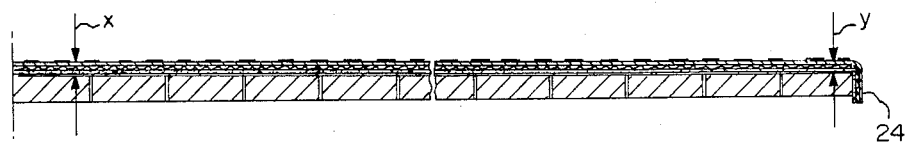
FIG. 5 illustrates a typical cross section of a wood deck, with the premolded fiberglass covering bonded to the deck by a flexible glue or mastic.

This deck covering is then transported to the wood deck site. The wood deck is then prepared by coating it with a heavy layer of flexible glue or mastic, and the fiberglass covering attached to the deck by the flexible bonding material. As best shown in FIG. 5, the lip 24 will extend over the juncture between the deck and the fiberglass covering to prevent the ingress of moisture into the bonding material.

This decking material is easier to apply and has a longer life and a more attractive appearance than other known decking materials. Furthermore, the fiberglass lay-up techniques of the method are well known techniques, often employed in the fiberglass boat industry, such that no additional knowledge or skills are required to lay up the fiberglass covering. The fiberglass gel coat also is better able to resist chipping or cracking than conventional paint since it is embedded in the fiberglass and resin.

Additional layers of glass can be layed in the mold to build a pitch, or variance in thickness, from one end of the premolded fiberglass covering to the other. This varying thickness from a high thickness at one end to a thin thickness at the other will give the fiberglass deck covering a premolded pitch for providing proper water drainage. This premolded pitch is illustrated best by the thickness arrows, X showing a greater thickness and the arrow Y showing a thinner thickness in FIG. 5.

While the preferred embodiments of the invention have been illustrated and described, it should be understood that variations will be apparent to one of ordinary skill in the art. Accordingly, the invention is not to be limited to the embodiments illustrated in the drawing.

I claim:
1. The method of covering an exterior wood deck with a fiberglass covering, comprising:
   laying up the fiberglass covering to a predetermined size and shape corresponding to the overall size and shape of the wood deck to be covered in a mold; and
   removing the covering from the mold intact and gluing the molded covering onto the exterior wood deck at the deck location to provide a waterproof covering in one piece over the exterior wood deck.
2. The method of claim 1, said step of laying up the fiberglass covering including:
   waxing the mold;
   applying release agent onto the waxed mold;
   applying colored gel coat onto the release agent;
   applying a coating of resin to the gel coat;
   laying fiberglass matting on the resin and rolling the matting into the resin; and
   curing the fiberglass resin coating.
3. The method of claim 2, including embossing the mold to obtain a textured, hardened gel coat in the final fiberglass covering.
4. The method of claim 1, including forming a lip on the fiberglass covering and attaching the lip over the edge of the wood deck to inhibit moisture moving into the juncture of the wood deck and fiberglass covering.

* * * * *